United States Patent
Polaganga et al.

(10) Patent No.: US 12,028,763 B1
(45) Date of Patent: Jul. 2, 2024

(54) DYNAMIC DETERMINATION OF OPTIMAL PRIMARY AND SECONDARY COMPONENT CARRIERS

(71) Applicant: T-Mobile Innovations LLC, Overland Park, KS (US)

(72) Inventors: Roopesh Kumar Polaganga, Bothell, WA (US); Rishitha Ponugoti, Kirkland, WA (US); Shiji Mary Mathew Enchakilodil, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 72 days.

(21) Appl. No.: 17/380,825

(22) Filed: Jul. 20, 2021

(51) Int. Cl.
*H04W 36/06* (2009.01)
*H04W 36/30* (2009.01)
*H04W 72/0453* (2023.01)
*H04W 72/52* (2023.01)

(52) U.S. Cl.
CPC ........... *H04W 36/06* (2013.01); *H04W 36/30* (2013.01); *H04W 72/0453* (2013.01); *H04W 72/52* (2023.01)

(58) Field of Classification Search
None
See application file for complete search history.

(56) References Cited

U.S. PATENT DOCUMENTS

| | | | |
|---|---|---|---|
| 11,039,352 B1* | 6/2021 | Sung | H04W 36/0094 |
| 2012/0051309 A1 | 3/2012 | Kim et al. | |
| 2012/0269148 A1 | 10/2012 | Hultell et al. | |
| 2015/0230233 A1* | 8/2015 | Kobayashi | H04W 72/20 370/329 |
| 2021/0266753 A1* | 8/2021 | Kumar | H04W 76/16 |
| 2022/0150756 A1* | 5/2022 | Garcia | H04L 5/001 |
| 2022/0376847 A1* | 11/2022 | He | H04W 72/23 |
| 2022/0377610 A1* | 11/2022 | Garcia | H04W 16/10 |

* cited by examiner

*Primary Examiner* — Kodzovi Acolatse
(74) *Attorney, Agent, or Firm* — Shook, Hardy & Bacon L.L.P.

(57) ABSTRACT

Methods and systems for selecting a primary component carrier for use in new radio (NR) carrier aggregation are described. A load of a first Dynamic Shared Spectrum (DSS) component carrier is monitored. When the load of the first DSS component carrier reaches a threshold value, an identification of one or more NR user equipment that are assigned to use the first DSS component carrier as a primary component carrier for carrier aggregation is made. The one or more NR user equipment are handed over from the first component carrier to a second component carrier for use as a primary component carrier for the one or more NR user equipment. Methods and systems for selecting a secondary component carrier for use in NR carrier aggregation are also described. A load of a first DSS component carrier is monitored, wherein the carrier is assigned as the secondary component carrier for one or more NR user equipment. A determination is made that the load of the first DSS component carrier has reached a threshold value. A second component carrier is re-assigned as the secondary component carrier for the one or more NR user equipment.

13 Claims, 6 Drawing Sheets

DYNAMIC DETERMINATION OF OPTIMAL PRIMARY AND SECONDARY COMPONENT CARRIERS

SUMMARY

The present disclosure is directed, in part, to improving end user throughput and optimizing spectrum usage in radio networks by intelligently prioritizing primary and secondary component carriers based on whether the carrier is a Dynamic Spectrum Sharing ("DSS") component carrier or a dedicated component carrier, substantially as shown in and/or described in connection with at least one of the figures, and as set forth more completely in the claims.

It is estimated that 4G networks and 5G New Radio ("NR") networks will continue to coexist for years to come. DSS and Carrier Aggregation are important to this coexistence. Through DSS, the same physical resource blocks of a given component carrier can be used by both 4G and 5G NR networks. In this way, operators can avoid having to re-farm spectrum and/or acquire additional costly spectrum for their 5G NR networks, which has been required in the past when shifting from legacy radio network technologies to the latest radio network technologies. Through carrier aggregation, one primary component carrier and one or more secondary component carriers are combined to transmit data thereby increasing capacity and data rates, which are characteristics desirable to end users.

In current 5G NR networks, the primary component carrier and secondary component carriers that are used for carrier aggregation are pre-determined without regard to whether or not they are a DSS component carrier or a dedicated component carrier. Because the physical resource blocks of DSS component carrier are shared between 4G and 5G NR networks, however, these resources are more likely to be unavailable for use in comparison to those of a dedicated component carrier thereby degrading end user throughput. Moreover, communications utilizing a DSS component carrier are subject to greater interference created with 4G communications in nearby 4G-only spectrum bands. Such interference is caused by continuous transmission of LTE Cell reference signals (CRS) where NR signals cannot be transmitted and creates an overhead on the NR. Here, in contrast, primary and secondary component carriers for use in carrier aggregation are intelligently prioritized based on whether they are a DSS component carrier or a dedicated component carrier thereby optimizing spectrum usage and improving end user throughput.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached figures, which are intended to be exemplary and non-limiting, wherein.

DETAILED DESCRIPTION

Figure 1:
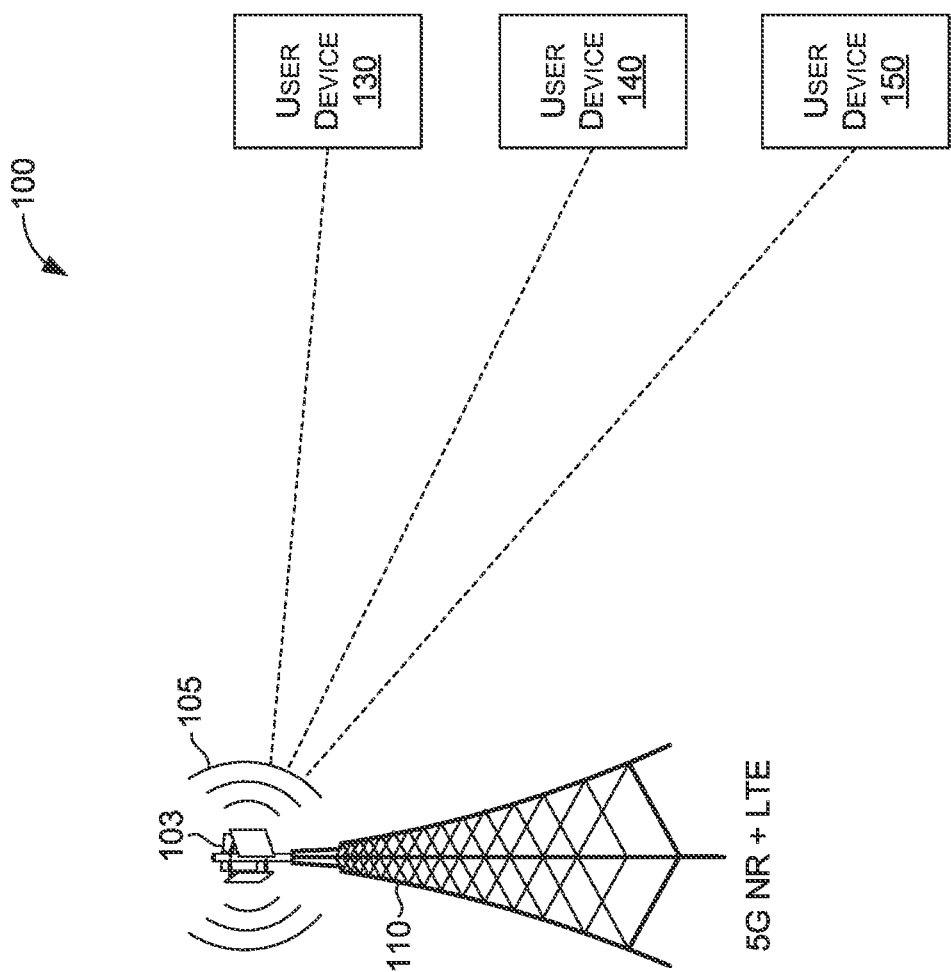
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for selecting a primary component carrier for use in NR carrier aggregation. The method includes monitoring the load of a DSS component carrier that is designated as a primary component carrier for NR carrier aggregation. The method also includes determining that the load of the DSS component carrier reaches a threshold value and identifying the NR user equipment that are assigned to use the first component carrier as a primary component carrier for carrier aggregation. The method further includes handing over the NR user equipment from the first component carrier to the second component carrier. In other embodiments, the method further includes determining that the secondary component carrier meets a quality criteria.

In other aspects, a system in a communication network is provided that is configured to monitor a load of a first DSS component carrier. The system is also configured to determine whether the load of the first DSS component carrier has reached a threshold value. The system is further configured to identify NR user equipment that are assigned to use the first DSS component carrier as a primary component carrier for carrier aggregation. The system is also configured to hand over the NR user equipment from the first component carrier to the second component carrier. In embodiments, the system is further configured to determine that the second component carrier meets a quality criteria.

In still other aspects, methods for selecting a secondary component carrier for use in new radio (NR) carrier aggregation are provided. The method includes monitoring a load of a first DSS component carrier, wherein the first DSS component carrier is assigned as a secondary component carrier for a NR user equipment. The method also includes determining that the load of the first DSS component carrier has reached a threshold value. The method further includes re-assigning a second component carrier as a secondary component carrier for the NR user equipment. In other embodiments, the method further includes determining that the second component carrier meets a quality criteria.

In further aspects, a system in a communication network is provided that is configured to monitor a load of a first component carrier, wherein the first component carrier is a DSS component carrier assigned as a secondary component carrier for a NR user equipment. The system determines that the load of the first component carrier has a reached a threshold value. The system re-assigns a second component carrier as the secondary component carrier for the NR user equipment. In other embodiments, the system further determine that the second component carrier meets a quality criteria.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 600 shown in FIG. 6. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 130, 140, and 150. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more user devices 130, 140, and 150 and other components, systems, equipment, and/or devices of the network environment 100. The base station and/or a computing device (e.g., whether local or remote) associated with the base station may manage or otherwise control the operations of components of the cell site 110. The cell site 110 may be a Time Division Duplex (TDD) cell site, a Frequency Division Duplex (FDD) cell site, or a combination TDD/FDD cell site. The cell site 110 may be equipped with two or more component carriers i.e. frequency blocks for NR Carrier Aggregation with at least one DSS shared cell having LTE bandwidth, such as 1.4, 3, 5, 10, or 20 MHz, and each being used for communication between the cell site 110 and the user devices 130, 140, and 150.

In some embodiments, the user device 130, 140, and/or 150 may take the form of a wireless or mobile device capable of communication via the network environment 100. For example, the user device 130, 140 and/or 150 may take the form of a mobile device capable of communication via a telecommunication network such as, but not limited to, a wireless telecommunication network. The user devices 130, 140, and/or 150 may be any mobile computing device that is able to communicate by way of a 5G network and/or a 4G network.

In some embodiments, the network environment 100 may be structured to connect subscribers to a service provider or a plurality of service providers. Alternatively or additionally, the network environment 100 may be associated with a specific telecommunication provider that provides services (e.g. 5G, voice, location, etc.) to one or more user devices 130, 140, and/or 150. For example, the user devices 130, 140, and 150 may be subscribers to a telecommunication service provider, in which the user devices 130, 140, and 150 are registered or subscribed to receive voice and data services over the network environment 100. The network environment 100 may include both a 4G network (LTE, WiMAX, HSDPA, GSM) and a 5G network. In addition, the network environment 100 may include a 1× circuit voice and/or a 3G network (e.g., CDMA, CDMA 2000, WCDMA, UMTS).

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
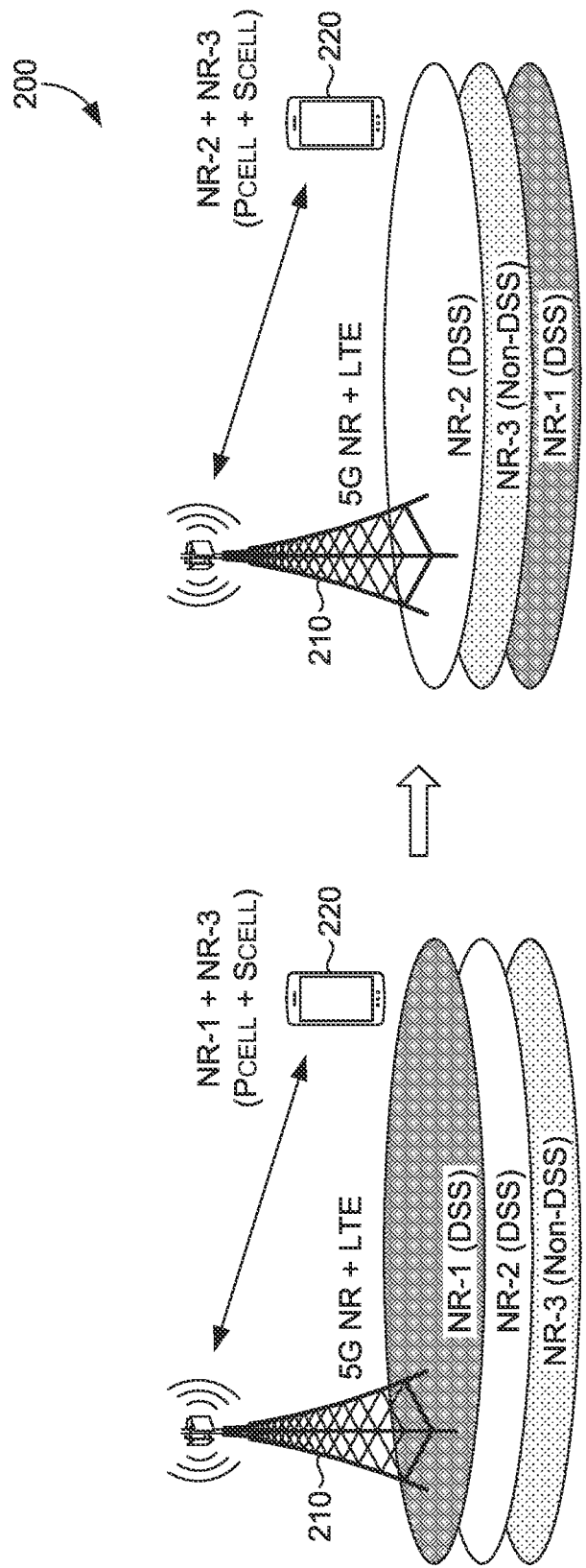
FIG. 2 depicts the results of an exemplary method for selecting a primary component carrier for use in NR carrier aggregation.

FIG. 2 illustrates the results of an exemplary method for selecting a primary component carrier for use in NR carrier aggregation in the network environment 200 (e.g., a telecommunication network such as, but not limited to, a wireless telecommunication network). In the present embodiment, the network environment 200 includes a 4G/5G cell site 210 equipped with three component carriers, NR-1, NR-2, and NR-3, wherein NR-1 is a DSS carrier, NR-2 is a DSS carrier, and NR-3 is a dedicated carrier. In other embodiments, the 4G/5G cell site 210 is equipped with two component carriers or four or more component carriers, wherein the components carriers are any combination of DSS and dedicated carriers. The network environment 200 further includes multiple user devices (not shown) located within the coverage area of the 4G/5G cell site 210. The multiple user devices can include, for example, a 5G NR user device 220, having component carrier NR-1 assigned as its primary component carrier ("PCC"), two or more additional component carriers NR-2 and NR-3 designated as second and third primary component carriers, and one or more component carriers assigned as its secondary component carrier(s) ("SCC").

In embodiments, the method includes monitoring the load of NR-1, wherein NR-1 is a DSS component carrier. In one embodiment, the load can be, for example, the number of physical resource blocks of NR-1 currently allocated. In other embodiments, the load can be, for example, the number of active user devices associated with NR-1. In embodiments, the method includes determining that the load of NR-1 has reached a threshold value. In specific embodiments, this threshold value is an operator-defined value, such as the maximum number of physical resource blocks of a component carrier that can be allocated while still maintaining acceptable end user throughput. For example, the threshold value of the load can be set to 50% or more physical resource block allocation of a component carrier. While in still other embodiments, the threshold value of the load can be set to 80% or more physical resource block allocation of a component carrier.

In embodiments, the method includes identifying 5G NR user devices located within the coverage area of the cell site 210 that are assigned the first component carrier NR-1 as a primary component carrier. In further embodiments, the method includes determining that a second component carrier, e.g. NR-2, for use as a primary component carrier for the identified NR user equipment meets a quality criteria. In embodiments, the quality criteria of a component carrier can be an acceptable signal strength value, using, for example, the Reference Signal Received Power (RSRP) for the carrier, such as a RSRP value of approximately −90 dBM or greater. In other embodiments, the quality criteria of a component carrier can be an acceptable signal strength value, using, for example, the Reference Signal Received Quality (RSRQ) for the carrier, such as a RSRQ value of approximately −15 dBM or greater. In other embodiments the quality criteria of a component carrier can be an acceptable Signal-to-Interference-plus-Noise-Ratio (SINR) value for the carrier, such as a value of approximately 0 dB or higher. In still further embodiments, the quality criteria of a component carrier can include any combination of acceptable RSRP, RSRQ, and/or SINR values for the carrier. The quality criteria is not limited to acceptable RSRP, RSRQ, and/or SINR values and can include any other acceptable quality criteria values for a carrier as is known in the art. In other embodiments, as illustrated in FIG. 2, the method includes handing over the NR user equipment from the first component carrier NR-1 to the second component carrier NR-2 if the second component carrier NR-2 meets a quality criteria.

In certain embodiments, the second component carrier is a dedicated component carrier. In other embodiments, the second component carrier is a DSS component carrier. In embodiments where the second component carrier is a DSS component carrier, the method may further include determining that a load of the second component carrier has not reached a threshold value before handing over the NR user equipment from the first component carrier to the second component carrier, wherein a threshold value can be an operator-defined value, such as the maximum number of physical resource blocks of a component carrier that can be allocated while still maintaining acceptable end user throughput as described above. In still further embodiments, after handing over the NR user equipment to the second component carrier NR-2 for use as a primary component carrier, the one or more component carriers for use as secondary component carriers are assigned to the NR user equipment.

Figure 3:
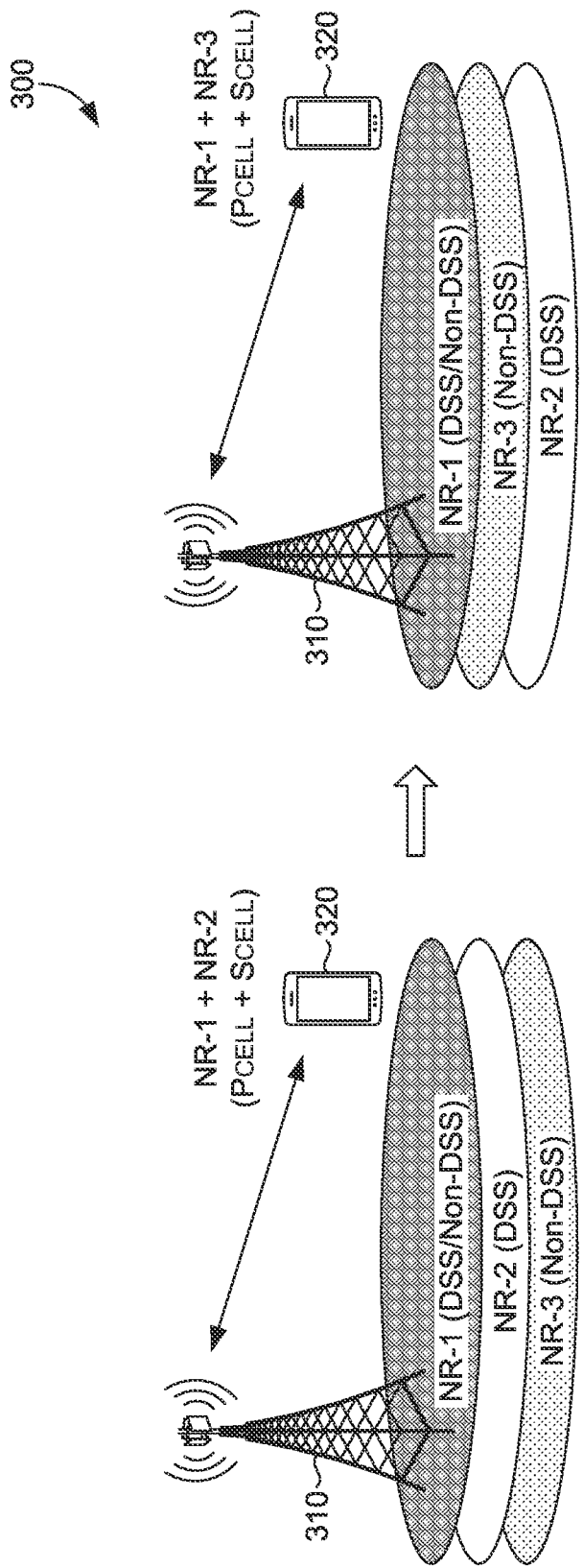
FIG. 3 depicts the results of an exemplary method for selecting a secondary component carrier for use in NR carrier aggregation.

FIG. 3 depicts the results of an exemplary method for selecting a secondary component carrier for use in NR carrier aggregation in the network environment 300 (e.g., a telecommunication network such as, but not limited to, a wireless telecommunication network). In the present embodiment, the network environment 300 includes a 4G/5G cell site 310 and multiple user devices (not shown) located within the coverage area of the cell site, wherein the multiple user devices can include, for example, a 5G NR user device 320. The 4G/5G cell site 310 is equipped with three component carriers, NR-1, NR-2, and NR-3, wherein NR-1 is a DSS or dedicated carrier, NR-2 is a DSS carrier, and NR-3 is a dedicated carrier. In other embodiments, the 4G/5G cell site 310 is equipped with two component carriers, and in still other embodiments, the 4G/5G cell site 310 is equipped with four or more component carriers, wherein the components carriers are any combination of DSS and dedicated carriers. The 5G user device 320 is assigned NR-1 as its primary component carrier. In other embodiments, multiple 5G user devices located within the coverage area of cell site 310 are assigned NR-1 as their primary component carrier. In further embodiments, the 5G user device 320 is assigned NR-2 and NR-3 as its secondary component carriers, wherein NR-2 is designated as having priority over NR-3. In other embodiments, multiple 5G user devices located within the coverage area of cell site 310 are assigned NR-2 and NR-3 as their secondary component carriers, wherein NR-2 is designated as having priority over NR-3.

In embodiments, the method illustrated in FIG. 3 includes monitoring the load of NR-2. In one embodiment, the load can be, for example, the number of physical resource blocks of NR-2 that are currently allocated. In other embodiments, the load can be, for example, the number of active user devices associated with component carrier NR-2. In embodiments, the method includes determining that the load of component carrier NR-2 has reached a threshold value. In specific embodiments, this threshold value is an operator-defined value, such as the maximum number of physical resource blocks of a component carrier that can be allocated while still maintaining acceptable end user throughput. For example, the threshold value of the load can be set to 50% or more physical resource block allocation of a component carrier. While in still other embodiments, the threshold value of the load can be set to 80% or more physical resource block allocation of a component carrier.

In further embodiments, the method includes determining that a component carrier NR-3 meets a quality criteria. In embodiments, the quality criteria of a component carrier can be an acceptable signal strength value, using, for example, the Reference Signal Received Power (RSRP) for the carrier, such as a RSRP value of approximately −90 dBM or greater. In other embodiments, the quality criteria of a component carrier can be an acceptable signal strength value, using, for example, the Reference Signal Received Quality (RSRQ) for the carrier, such as a RSRQ value of approximately −15 dBM or greater. In other embodiments the quality criteria of a component carrier can be an acceptable Signal-to-Interference-plus-Noise-Ratio (SINR) value for the carrier, such as a value of approximately 0 dB or higher. In still further embodiments, the quality criteria of a component carrier can include any combination of acceptable RSRP, RSRQ, and/or SINR values for the carrier. The quality criteria is not limited to acceptable RSRP, RSRQ, and/or SINR values and can include any other acceptable quality criteria values for a carrier as is known in the art. In other embodiments, if the second component carrier NR-3 meets a quality criteria, the method includes re-assigning the second component carrier NR-3 as the secondary component carrier for the NR user equipment.

In certain embodiments, the second component carrier is a dedicated component carrier. In other embodiments, the second component carrier is a DSS component carrier. In embodiments where the second component carrier is a DSS component carrier, the method may further include determining that a load of the second component carrier has not reached a threshold value before re-assigning the second component carrier as the secondary component carrier for the NR user equipment. The threshold value can be an operator-defined value, such as the maximum number of physical resource blocks of a component carrier that can be allocated while still maintaining acceptable end user throughput as described above.

Figure 4:
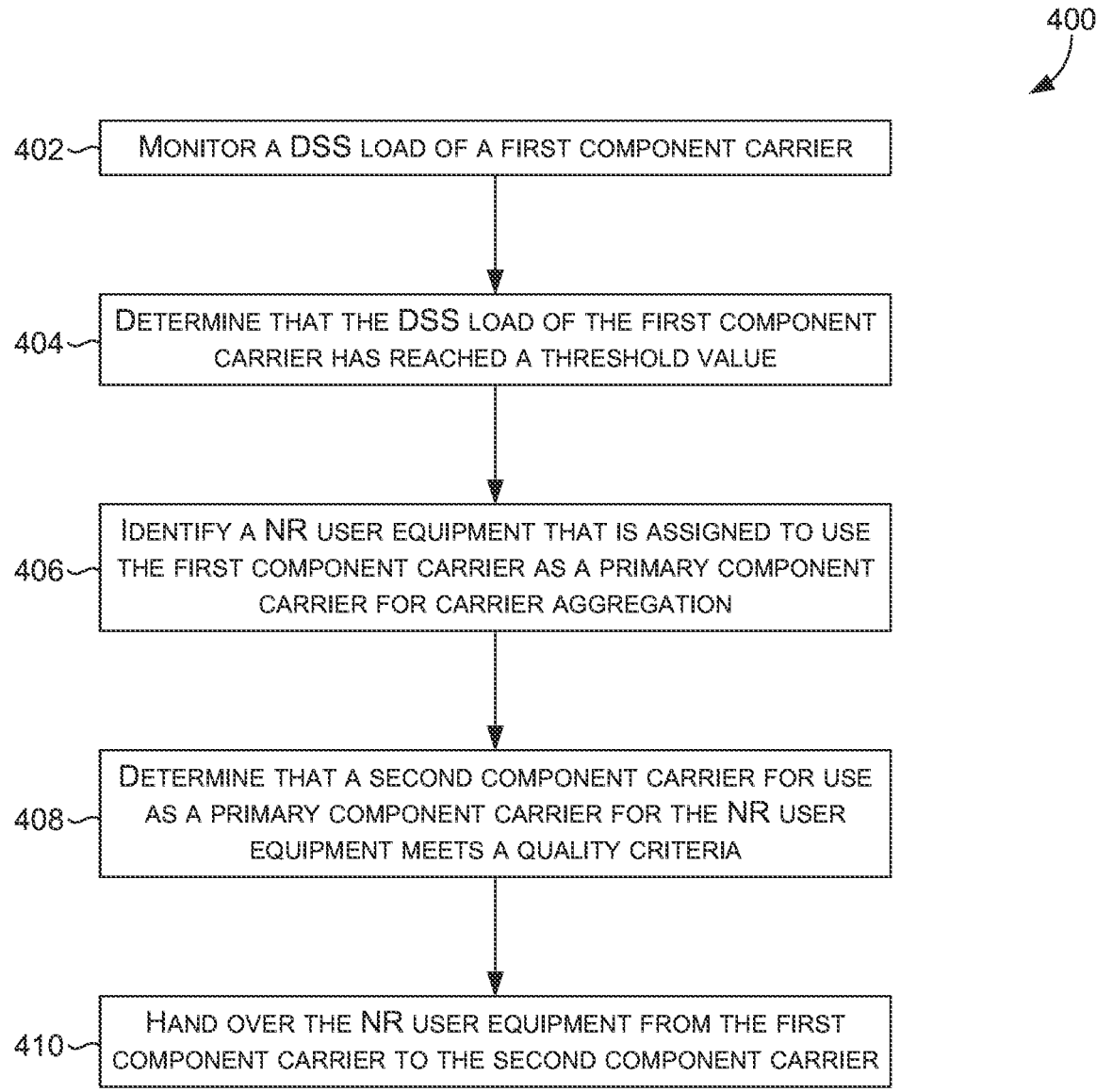
FIG. 4 depicts a flow diagram of an exemplary method for selecting a primary component carrier for use in NR carrier aggregation.

FIG. 4 depicts a flow diagram of an exemplary method 400 for selecting a primary component carrier for use in NR carrier aggregation, in accordance with implementations of the present disclosure. At block 402, a load of a first component carrier is monitored. The first component carrier may be a DSS component carrier. The DSS component carrier may further be provisioned for use in either FDD 4G and 5G networks or TDD 4G and 5G radio networks. At block 404, a determination is made that the first component carrier has reached a threshold value. This threshold value may be the maximum number of physical resource blocks of a component carrier that can be allocated while still maintaining acceptable end user throughput. At block 406, one or more NR user equipment that are assigned to use the first component carrier as a primary component carrier for carrier aggregation are identified. At block 408, a determination is made that a second component carrier for use as a primary component carrier for the NR user equipment meets a quality criteria. The quality criteria may be an acceptable signal strength value for the carrier, such as an acceptable RSRP, RSRQ, and/or SINR value. At block 410, the NR user equipment is handed over from the first component carrier to the second component carrier.

Figure 5:
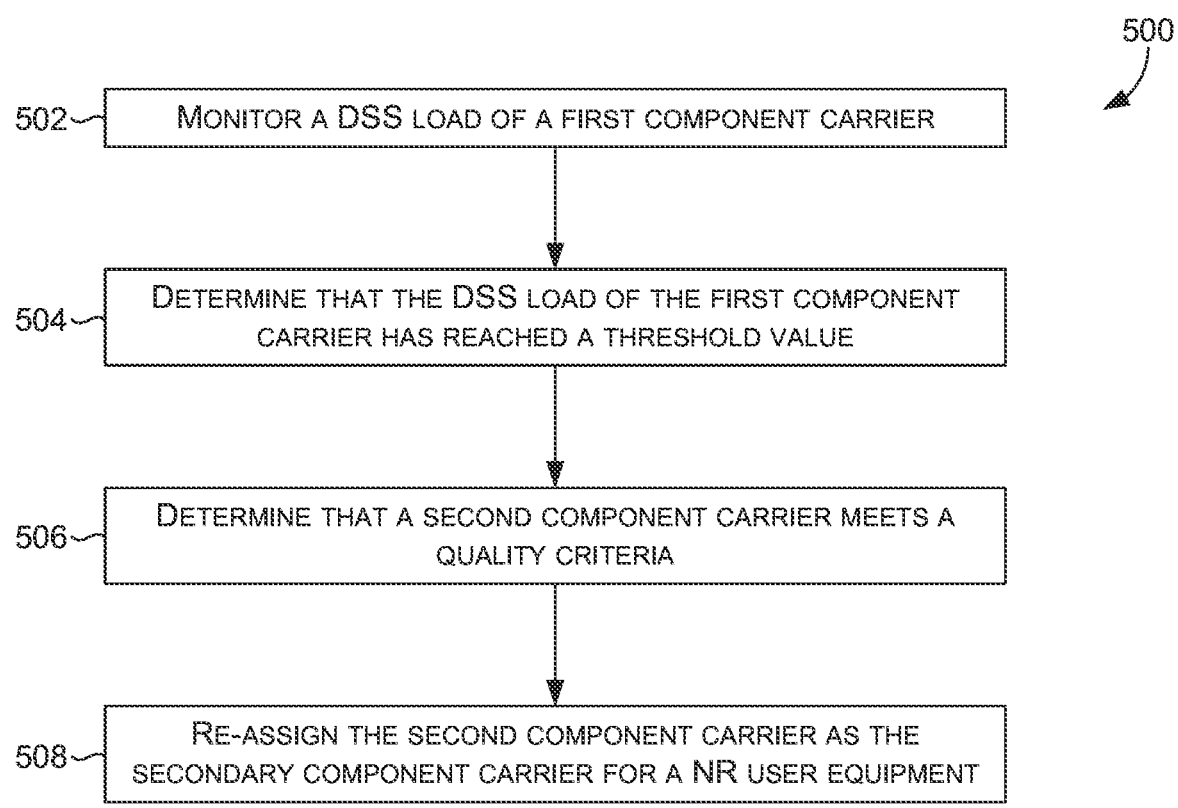
FIG. 5 depicts a flow diagram of an exemplary method for selecting a secondary component carrier for use in NR carrier aggregation.

FIG. 5 depicts a flow diagram of an exemplary method 500 for selecting a secondary component carrier for use in NR carrier aggregation, in accordance with implementations of the present disclosure. At block 502, a load of first component carrier is monitored. The first component carrier may be a DSS component carrier. The first component carrier may be assigned as a secondary component carrier for a NR user equipment. The first component carrier may further be provisioned for use in either FDD 4G and 5G networks or TDD 4G and 5G radio networks. At block 504, a determination is made that the load of the first component carrier has reached a threshold value. This threshold value may be the maximum number of physical resource blocks of a component carrier that can be allocated while still maintaining acceptable end user throughput. At block 506, a determination is made that a second component carrier meets a quality criteria. The quality criteria may be an acceptable signal strength value for the carrier, such as an acceptable RSRP, RSRQ, and/or SINR value. At block 508, the second component carrier is re-assigned as the secondary component carrier for the NR user equipment.

Figure 6:
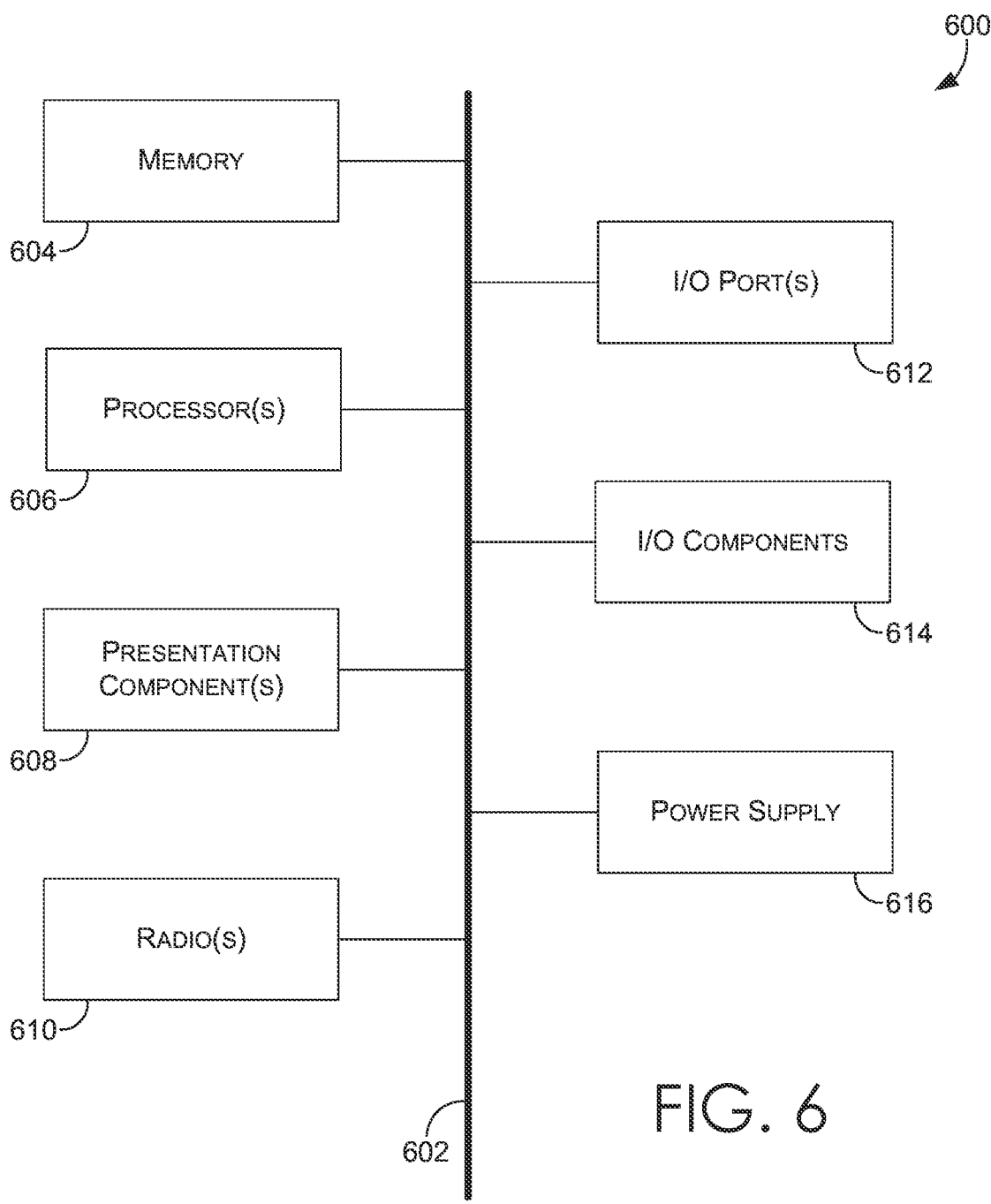
FIG. 6 depicts an exemplary computing device suitable for use in implementations of aspects herein.

Referring to FIG. 6, a block diagram of an example of a computing device 600 suitable for use in implementations of the technology described herein is provided. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. In aspects, the computing device 600 may be a base station. In another embodiment, the computing device 600 may be UE capable of two-way wireless communications with an access point. Some non-limiting examples of the computing device 600 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 6, computing device 600 includes a bus 602 that directly or indirectly couples various components together. The bus 602 may directly or indirectly couple one or more of memory 604, processor(s) 606, presentation component(s) 608 (if applicable), radio(s) 610, input/output (I/O) port(s) 612, input/output (I/O) component(s) 614, and/or power supply 616. Although the components of FIG. 6 are shown with lines for the sake of clarity, in reality, delineating various components is not so clear, and metaphorically, the lines would more accurately be grey and fuzzy. For example, one may consider a presentation component(s) 608 such as a display device to be one of I/O components 614. Also, the processor(s) 606 may include memory 604, in another example. The present disclosure hereof recognizes that such is the nature of the art, and reiterates that FIG. 6 is merely illustrative of an example of a computing device 600 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 604 may take the form of memory components described herein. Thus, further elaboration will not be provided here, but it should be noted that memory 604 may include any type of tangible medium that is capable of storing information, such as a database or data store. A database or data store may be any collection of records, files, or information encoded as electronic data and stored in memory 604, for example. In one embodiment, memory 604 may include a set of embodied computer-readable and executable instructions that, when executed, facilitate various functions or elements disclosed herein. These embodied instructions will variously be referred to as "instructions" or an "application" for short.

Processor(s) 606 may be multiple processors that receive instructions and process them accordingly. Presentation component(s) 608, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 610 represents one or more radios that facilitate communication with a wireless telecommunication network. For example, radio(s) 610 may be connected to one or more antenna elements through a physical path. Illustrative wireless telecommunications technologies include CDMA, GPRS, TDMA, GSM, and the like. Radio(s) 610 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 610 may be configured to concurrently support multiple technologies, as previously discussed herein. As such, each of many radio(s) 610 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 612 may take a variety of forms. Exemplary I/O ports 612 may include a USB jack, a stereo jack, an infrared port, a firewire port, other proprietary communications ports, and the like. Input/output (I/O) components 614 may comprise keyboards, microphones, speakers, touchscreens, and/or any other item usable to directly or indirectly input data into the computing device 600.

Power supply 616 may include batteries, fuel cells, and/or any other component that may act as a power source to supply power to the computing device 600 or to other network components, including through one or more electrical connections or couplings. Power supply 616 may be configured to selectively supply power to different components independently and/or concurrently.

Finally, regarding FIGS. 1 through 6, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method for selecting a primary component carrier for use in new radio (NR) carrier aggregation, the method comprising:
    monitoring a load of a first component carrier, wherein the load is at least one of a number of physical resource blocks allocated and a number of active user devices associated with the first component carrier;
    monitoring a load of a second component carrier and a third component carrier;
    determining that the load of the second component carrier has reached a threshold value;
    identifying a NR user equipment that is assigned to use the first component carrier as a primary component carrier for carrier aggregation and the second component carrier as a secondary component carrier for carrier aggregation; and based on the load of the second component carrier, re-prioritizing the third component carrier to have a priority value greater than the second component carrier.

2. The method of claim 1, wherein the third component carrier is a dedicated component carrier.

3. The method of claim 1, wherein the second component carrier is a DSS component carrier.

4. A system in a communication network, the system configured to:
monitor a load of a second dynamic spectrum sharing (DSS) component carrier, wherein the load is at least one of a number of physical resource blocks allocated and a number of active user devices associated with the second DSS component carrier;
monitor the load of a third non-DSS component carrier;
determine that the load of the second DSS component carrier has reached a threshold value;
identify a new radio (NR) user equipment that is assigned to use a first DSS component carrier as a primary component carrier for carrier aggregation and the second DSS component carrier as a secondary component carrier, wherein the second DSS component carrier is designated as having a priority value greater than the third non-DSS component carrier;
based on the load of the second DSS component carrier, re-prioritize the third non-DSS component carrier to have a priority value greater than the second DSS component carrier; and
designated the third non-DSS component carrier as the secondary component carrier for the NR user equipment.

5. The system of claim 4, wherein the first component carrier is a TDD component carrier.

6. The system of claim 4, wherein the second component carrier is a TDD component carrier.

7. The system of claim 4, wherein the first component carrier is a FDD component carrier.

8. The system of claim 4, wherein the second component carrier is an FDD component carrier.

9. The system of claim 4, wherein the third non-DSS component carrier is a dedicated component carrier.

10. A method for selecting a secondary component carrier for use in new radio (NR) carrier aggregation, the method comprising:
monitoring a load of a second component carrier, wherein the second component carrier is a DSS component carrier and is assigned as the secondary component carrier for a NR user equipment using a first DSS component carrier as a primary component carrier, and wherein the load is at least one of a number of physical resource blocks allocated and a number of active user devices associated with the first component carrier;
determining that the load of the second, component carrier has reached a threshold value; and
re-assigning a third component carrier as the secondary component carrier for the NR user equipment carrier, wherein the second component carrier meets a predetermined quality criteria that comprises a combination of signal quality values, signal power values, and signal to interference plus noise ratios.

11. The method of claim 10, wherein the third component carrier is a dedicated component carrier.

12. The method of claim 10, wherein the second component carrier is a DSS component carrier.

13. The method of claim 12, further comprising determining that a load of the second component carrier has not reached the threshold value before re-assigning the second component carrier as the secondary component carrier for the NR user equipment.

* * * * *